(12) United States Patent
Murray et al.

(10) Patent No.: US 6,905,153 B2
(45) Date of Patent: Jun. 14, 2005

(54) PUSH BUMPER

(75) Inventors: Kurt R. Murray, Carmel, IN (US); Ben Muilenburg, Fishers, IN (US); Jeffrey T. Bounds, Fishers, IN (US)

(73) Assignee: Pro-Gard Industries, L.P., Indianapolis, IN (US)

( * ) Notice: Subject to any disclaimer, the term of this patent is extended or adjusted under 35 U.S.C. 154(b) by 0 days.

(21) Appl. No.: 10/705,485

(22) Filed: Nov. 11, 2003

(65) Prior Publication Data

US 2004/0135385 A1 Jul. 15, 2004

Related U.S. Application Data

(60) Provisional application No. 60/425,550, filed on Nov. 11, 2002.

(51) Int. Cl.$^7$ .............................................. B60R 19/44
(52) U.S. Cl. ...................................... 293/115; 293/154
(58) Field of Search .............................. 293/115, 116, 293/120, 121, 142, 143, 144, 146

(56) References Cited

U.S. PATENT DOCUMENTS

| | | |
|---|---|---|
| 1,037,122 A | 8/1912 | Buffinger et al. |
| 1,306,364 A | 6/1919 | Warman |
| 1,542,272 A | 6/1925 | Ravelo |
| 1,688,950 A | 10/1928 | Wait |
| 1,726,956 A | 9/1929 | Hudson |
| 1,807,640 A | 6/1931 | Thomas |
| 1,911,413 A | 5/1933 | Wait |
| 2,525,964 A | 10/1950 | Slaback |
| 2,580,755 A | 1/1952 | Funk |
| 2,649,308 A | 8/1953 | Bice, Jr. |
| 2,650,849 A | 9/1953 | Poncher et al. |
| 2,687,912 A | 8/1954 | Beauchamp |
| 2,844,864 A | 7/1958 | Schilberg |
| 2,954,256 A | 9/1960 | Barenyi |
| 3,431,005 A | 3/1969 | Priefert |
| 3,438,667 A | 4/1969 | Davis |
| 3,470,598 A | 10/1969 | Berthelsen |
| 3,610,609 A | 10/1971 | Sobel |
| 3,746,383 A | 7/1973 | Davis |
| 3,774,952 A | 11/1973 | Zorn |
| 4,068,877 A | 1/1978 | Burleson |
| 4,159,584 A | 7/1979 | Niemela |
| 4,168,855 A | 9/1979 | Koch |
| 4,274,648 A | 6/1981 | Robins |
| 4,322,106 A | 3/1982 | Nespor |
| 4,469,360 A | 9/1984 | Drury |
| 4,641,870 A | 2/1987 | Heyman |
| 4,753,447 A | 6/1988 | Hall |
| 4,825,975 A | 5/1989 | Symes |
| 4,964,256 A | 10/1990 | McCracken |
| 5,067,760 A | 11/1991 | Moore et al. |
| 5,139,295 A | 8/1992 | Escobedo |
| 5,215,343 A | 6/1993 | Fortune |
| 5,277,465 A | 1/1994 | Weir |
| 5,683,128 A | 11/1997 | Heyns |
| 5,695,228 A | 12/1997 | Storer |
| D395,416 S | 6/1998 | Shklyaver |
| D396,678 S | 8/1998 | Shklyaver |
| 5,839,759 A | 11/1998 | Trigo |

(Continued)

FOREIGN PATENT DOCUMENTS

| | | |
|---|---|---|
| FR | 1524296 | 4/1968 |
| GB | 323468 | 12/1929 |

OTHER PUBLICATIONS

Troy Push Bumpers 2 pgs.
Troy Public Safety Products, cover and p. 1, 1993.

(Continued)

*Primary Examiner*—Patricia L. Engle
(74) *Attorney, Agent, or Firm*—Baker & Daniels LLP

(57) ABSTRACT

A push bumper apparatus configured to be coupled to a vehicle.

24 Claims, 13 Drawing Sheets

U.S. PATENT DOCUMENTS

| | | |
|---|---|---|
| 6,022,057 A | 2/2000 | Vermeulen |
| 6,113,164 A | 9/2000 | Setina |
| 6,231,093 B1 | 5/2001 | Storer |
| 6,318,773 B2 | 11/2001 | Storer |
| 6,398,276 B1 | 6/2002 | Smith |

OTHER PUBLICATIONS

Inch's Tooling & Machining Internal and External Vehicle Brackets literature, 1 pg., at least as early as Dec. 1999.

Setina Push Bumpers at www.setina.com, 4 pgs. Oct. 13, 1999.

Setina Manufacturing Police Vehicle Equipment 2001 brochure, cover and pp. 10 and 11.

Setina Manufacturing Police Vehicle Equipment 2000 brochure, cover and pp. 10 and 11.

Setina Manufacturing Co., Inc. Bodyguard PB200 Series bumpers brochure, 2 pgs.

Setina Manufacturing Police Vehicle Equipment brochure, cover and p. 6, Mar. 1998.

Setina Models 3000 and 3100 Specifications, 1 pg.

Rhino Guards! brochure, 4 pgs., circa Jul. 1999.

Go Rhino! Products "The Experts in Front End Protection", 3 pgs.

Troy Products 2001 Vehicle Equipment Catalog, cover and pp. 25 and 26.

Inch's Tooling & Machining drawing of 1999 CV Push Bumper w/Pads.

Pro–Gard Series E1000 Bumper Guard installation instructions, Nov. 1998.

PUSH BUMPER

CROSS-REFERENCE TO RELATED APPLICATION

This application claims the benefit of U.S. Provisional Patent Application Ser. No. 60/425,550, filed Nov. 11, 2002, the disclosure of which is expressly incorporated by reference herein.

BACKGROUND AND SUMMARY OF THE INVENTION

The present invention relates to a vehicle bumper, and more particularly to a push bumper apparatus configured to be coupled to a vehicle in front of an existing bumper system, such as the type used on law enforcement vehicles. Push bumpers are often used to push stalled or disabled vehicles out of the way.

Conventional push bumpers are typically coupled with bolts or screws to an existing vehicle bumper. This requires making holes in the existing bumper, often through a structural member of the bumper, or at least making holes though the bumper cover or fascia to gain access to any preexisting holes. Such installation results in permanent damage to the existing bumper and/or fascia, which reduces the vehicle's resale value or requires costly repair before resale. Moreover, installation that requires making holes in the existing vehicle bumper or fascia is often a time-consuming and therefore relatively expensive proposition. Furthermore, coupling a push bumper directly to an existing vehicle bumper with bolts or screws can result in a concentration of force from the push bumper to relatively small areas of the existing bumper.

According to an illustrative embodiment, a push bumper apparatus of the present invention is configured to be coupled to a vehicle including a bumper, a frame assembly positioned in longitudinally spaced relation to the bumper, and a fascia positioned in longitudinally spaced relation in front of the bumper. The push bumper apparatus includes at least one push member, a front clamping member including a first clamping surface configured to face a front surface of one of the bumper and the frame assembly, and a rear clamping member including a second clamping surface configured to face a rear surface of one of the bumper and the frame assembly. A fastener connects the front clamping member and the rear clamping member such that the one of the bumper and the frame assembly is clamped between the first clamping surface and the second clamping surface. A support member is configured to secure one of the front clamping member and the rear clamping member to the push member without requiring new openings to be formed through any of the bumper, the frame assembly, and the fascia.

Illustratively, the at least one push member comprises a first vertical push member, and a second vertical push member is positioned in laterally spaced relation to the first vertical push member. A connecting member is coupled to and extends between the first and second vertical push members. The connecting member illustratively comprises a horizontal shelf configured to receive at least one accessory thereon. Further, a speaker bracket illustratively extends downwardly from the shelf.

Further illustratively, the support member is configured to pass through a pre-existing opening formed within the fascia.

Illustratively, the first and second vertical push members are releasably coupled to the connecting members such that the lateral spacing between the first and second vertical push members may be varied by replacing the connecting member with a second connecting member having a different width.

Illustratively, the frame assembly includes a laterally extending cross-frame member, the first clamping surface of the front clamping member being configured to face a front surface of the cross-frame member, and the second clamping surface of the rear clamping member being configured to face a rear surface of the cross-frame member, such that the cross-frame member is clamped therebetween.

Further illustratively, a breakaway coupling is coupled to the support member and is configured to disconnect the push member from the one of the front clamping member and the rear clamping member upon the application of a predetermined force to the push member.

According to a further illustrative embodiment, a push bumper apparatus of the present invention is configured to be coupled to a frame assembly of a vehicle, the vehicle including a bumper positioned in longitudinally spaced relation to the frame assembly, and a fascia positioned in longitudinally spaced relation in front of the bumper. The push bumper apparatus includes a push member, a coupler configured to be supported by the frame assembly, and a lower support member configured to secure the coupler to the push member and extending vertically below the bumper from the coupler to the push member. An upper support member is configured to secure the coupler to the push member and extends vertically above the bumper from the coupler to the push member.

Illustratively, the coupler includes a front clamping member including a first clamping surface configured to face a front surface of the frame assembly, and a rear clamping member including a second clamping surface configured to face a rear surface of the frame assembly. A fastener connects the front clamping member and the rear clamping member such that the frame assembly is clamped intermediate the front clamping surface and the rear clamping surface.

Illustratively, the push member includes a first vertical push member, the push bumper apparatus further including a second vertical push member positioned in laterally spaced relation to the first vertical push member, and a connecting member coupled to and extending between the first and second vertical push members.

Illustratively, the lower support member passes through a first pre-existing opening formed within the fascia, and the upper support member passes through a second pre-existing opening formed within the fascia in spaced relation to the first pre-existing opening.

According to a further illustrative embodiment, a push bumper apparatus of the present invention is configured to be coupled to a frame assembly of a vehicle, the vehicle including a bumper positioned in longitudinally spaced relation to the frame assembly, and a fascia positioned in longitudinally spaced relation in front of the bumper. The push bumper apparatus includes a first push member, a second push member positioned in laterally spaced relation to the first push member, a first clamping member including a first clamping surface configured to face a first frame surface of the frame assembly, and a second clamping member including a second clamping surface configured to face a second frame surface of the frame assembly. A fastener connects the first clamping member and the second clamping member such that the frame assembly is clamped between the first clamping surface and the second clamping surface. A first support arm is configured to couple the first clamping member to the first push member, and a second support arm is configured to couple the first clamping member to the second push member, the second support arm position being positioned in laterally spaced relation to the first support arm.

Illustratively, the push bumper apparatus further includes a connecting member extending between the first and second push members, the first and second push members being releasably coupled to the connecting member such that the lateral spacing between the first and second push members may be varied by replacing the connecting member with a second connecting member having a different width.

Illustratively, the frame assembly includes a laterally extending cross-frame member, the first clamping surface of the first clamping member being configured to face a front surface of the cross frame member, and the second clamping surface of the second clamping member being configured to face a rear surface of the cross-frame member, such that the cross-frame member is clamped therebetween.

Further illustratively, the first and second support arms are configured to pass through pre-existing openings formed within the fascia.

According to yet another illustrative embodiment, a push bumper of the present invention is configured to be coupled to a frame assembly of a vehicle, the vehicle including a bumper positioned in longitudinally spaced relation to the frame assembly, and a fascia positioned in longitudinally spaced relation in front of the bumper. The push bumper apparatus includes a first push member, a second push member positioned in spaced relation to the first push member, and a connecting member having a first end connected to the first push member and a second end connected to the second push member. A coupler is configured to couple the first and second push members to the vehicle frame assembly.

Illustratively, the first and second push members are coupled to the vehicle frame assembly without requiring new openings to be formed in any of the bumper, the frame assembly, and the fascia.

Further illustratively, the coupler comprises a front clamping member including a first clamping surface configured to face a front surface of the frame assembly, and a rear clamping member including a second clamping surface configured to face a rear surface of the frame assembly. A fastener connects the front clamping member and the rear clamping member such that the frame assembly is clamped intermediate the front clamping surface and the rear clamping surface.

Further illustratively, the frame assembly includes a laterally extending cross-frame member, the first clamping surface of the front clamping member being configured to face a front surface of the cross-frame member, and the second clamping surface of the rear clamping member being configured to face a rear surface of the cross-frame member, such that the cross-frame member is clamped therebetween.

Additional features and advantages of the present invention will become apparent to those skilled in the art upon consideration of the following detailed description of the illustrated embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
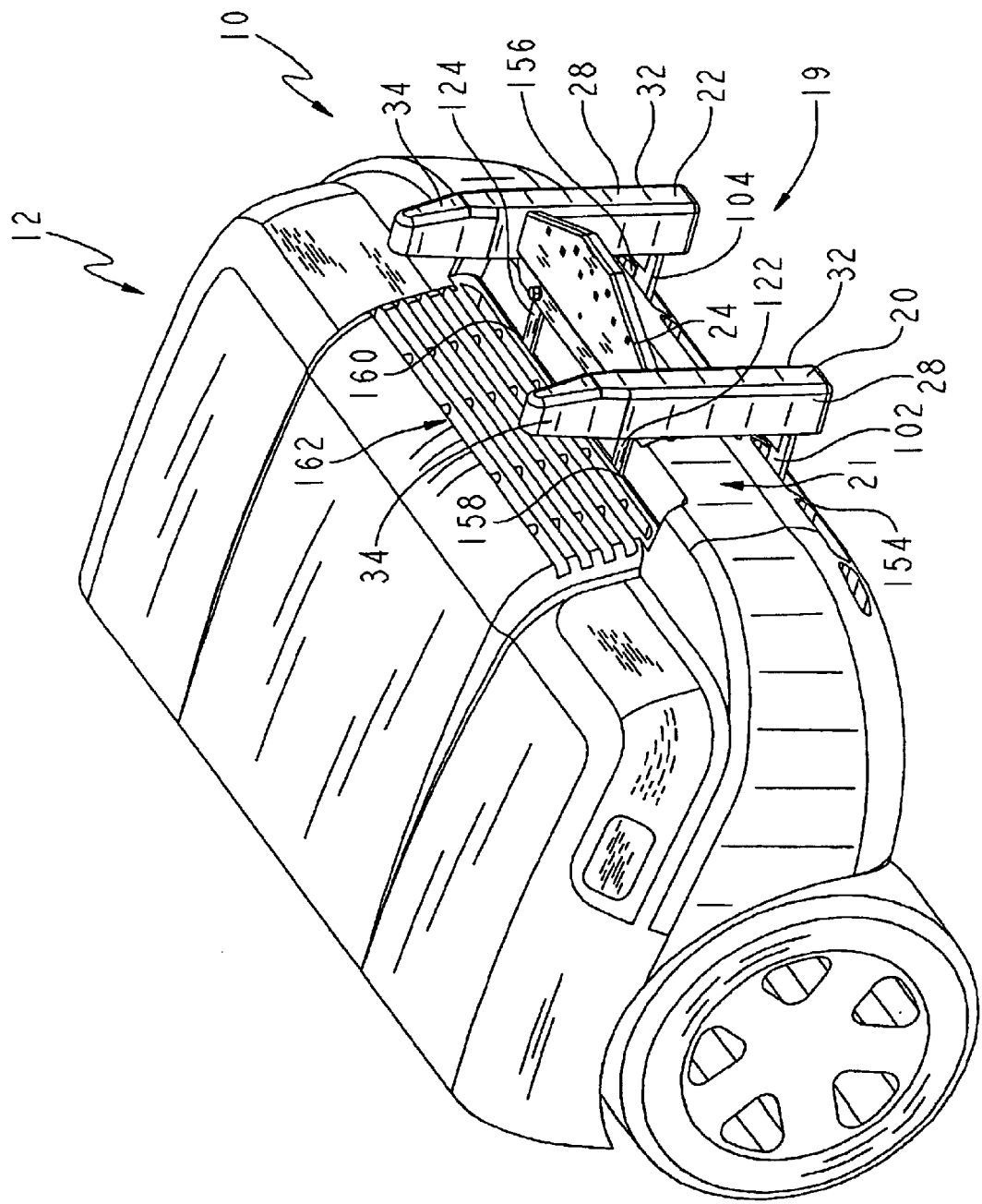
FIG. 1 is a perspective view of an illustrative embodiment push bumper according to the present invention supported adjacent the front of a vehicle.

A push bumper 10 according to an illustrative embodiment of the present invention is coupled to a conventional vehicle 12 as illustrated in FIG. 1. While the illustrated vehicle 12 used in combination with the push bumper 10 is a 2003 Ford Crown Victoria automobile, it should be appreciated that the push bumper 10 of the present invention may find equal applicability with other vehicles.

Figure 2:
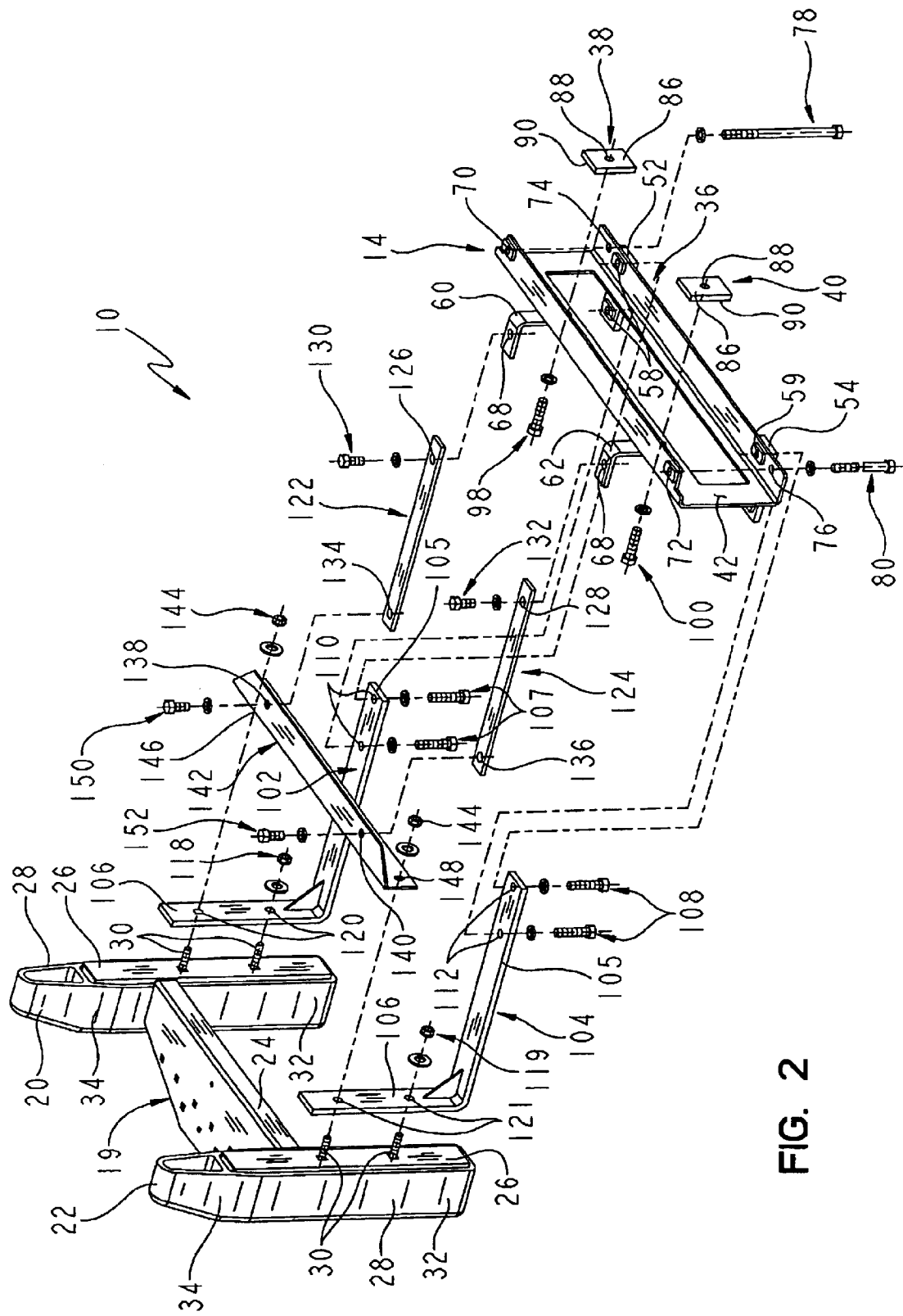
FIG. 2 is an exploded perspective view of the push bumper of FIG. 1.
Figure 3:
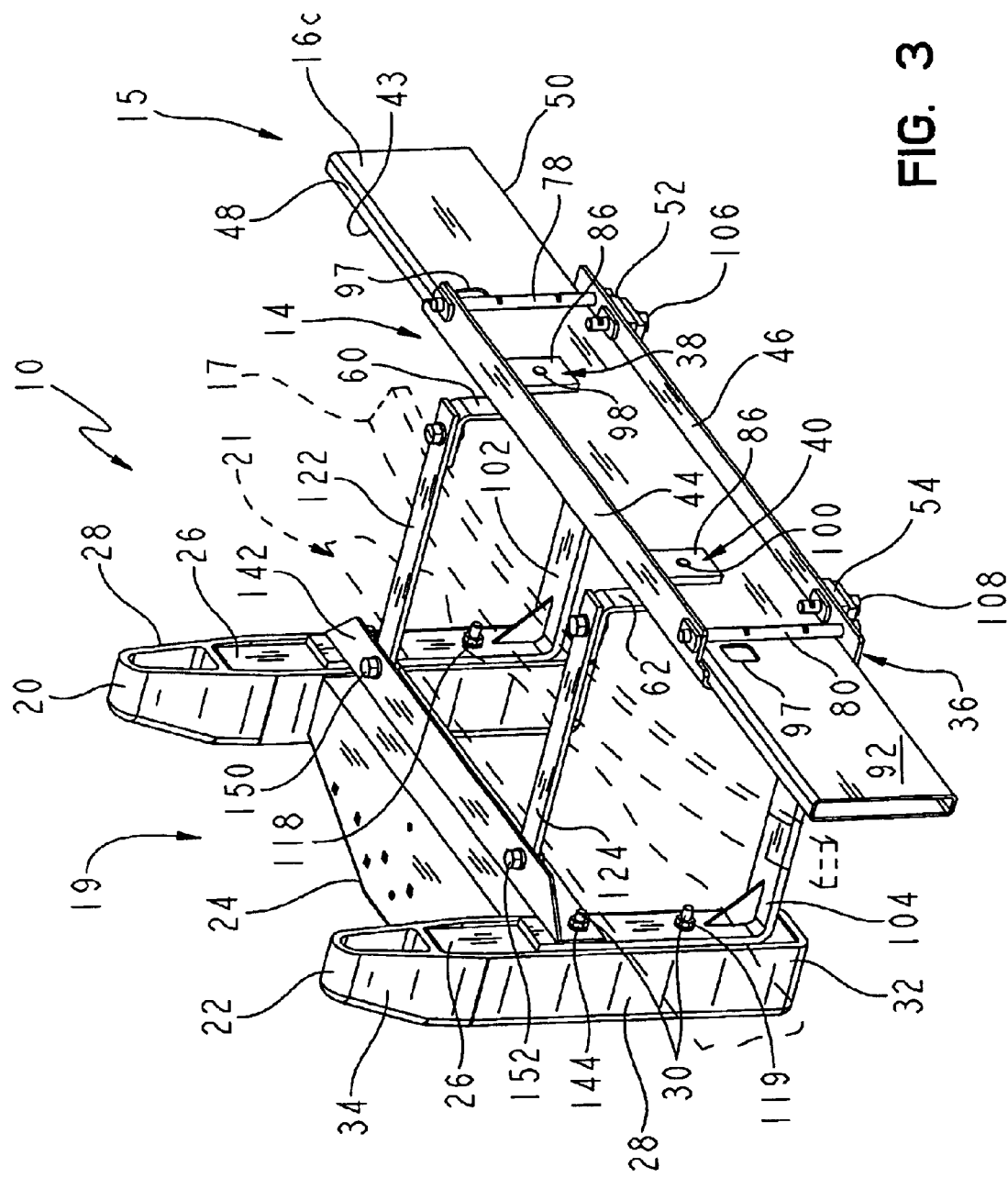
FIG. 3 is a rear perspective view of the push bumper of FIG. 1, illustrating the push bumper coupled to a laterally extending cross-frame member of the vehicle frame assembly and straddling a conventional front bumper of the vehicle.
Figure 8:
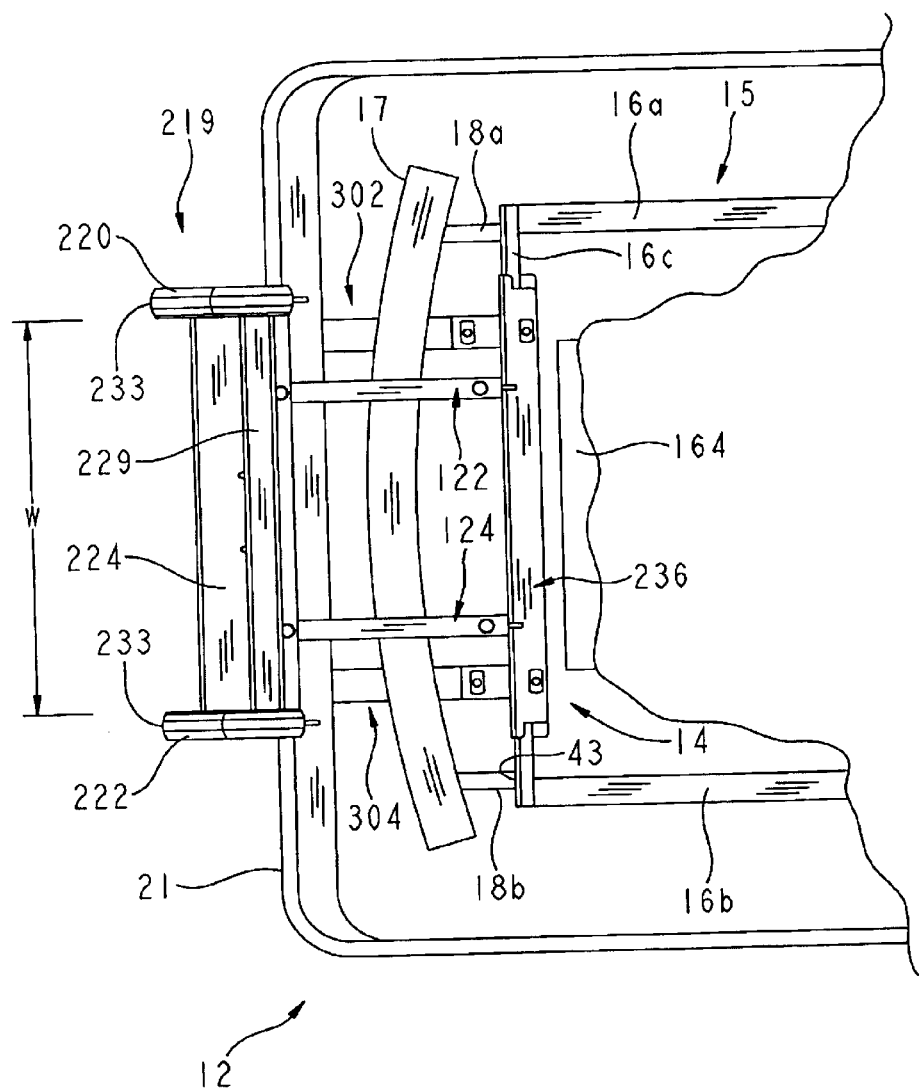
FIG. 8 is a top plan view, in partial schematic, illustrating the mounting of the push bumper of FIG. 6 to a vehicle frame assembly.

Referring now FIGS. 1–3, the push bumper 10 includes a clamp assembly 14 that is coupled to a frame assembly 15 of the vehicle 12. The frame assembly 15 illustratively includes longitudinally extending first and second main frame members 16a and 16b (FIG. 8). A front cross-frame member 16c extends laterally between the first and second main frame members 16a and 16b and is illustratively positioned longitudinally behind a conventional bumper 17 of the vehicle 12 (FIGS. 3 and 8). The bumper 17 is illustratively coupled to the cross-frame member 16c by bumper mounts 18a and 18b (FIG. 8). A rear cross-frame member (not shown) may likewise extend between the main frame members 16a and 16b proximate the rear of the vehicle 12. As known in the art, the frame assembly 15 is formed from a rigid material, typically steel.

While in the following description, the clamp assembly 14 is described as being coupled to the cross-frame member 16c, it should be appreciated that the clamp assembly 14 may be coupled to other members of the frame assembly 15, including either of the main frame members 16a and 16b.

A vehicle push member assembly 19 is coupled to the clamp assembly 14 and includes first and second laterally spaced vertical push members 20 and 22. A bumper cover or fascia 21 of the vehicle 12 is positioned intermediate the bumper 17 and the push member assembly 19. The first and second push members 20 and 22 are coupled to a horizontal connecting member, illustratively a shelf 24. The shelf 24 is illustratively welded to the push members 20 and 22, although other fastening means, such as conventional bolts may be readily substituted therefor. The shelf 24 may be utilized to support accessories, such as fog lights, sirens, speakers, etc. (not shown).

The clamp assembly 14 is configured to transmit axial forces from the push member assembly 19 directly to the cross-frame member 16c over a distributed area. As such, the push bumper 10 is coupled proximate the front of a vehicle 12 to allow the vehicle 12 to push objects, such as other vehicles, using the push bumper 10 to transmit axial forces directly and efficiently onto the structure of the vehicle's existing frame assembly 15.

Referring further to FIGS. 2 and 3, the push members 20 and 22 each include a substantially rectangular support column 26 and an outer sheath 28. The columns 26 are illustratively formed from metal, although any material of suitable structural strength may be used. A pair of bolts or threaded studs 30 are supported within each support column 26 and facilitate coupling to the clamp assembly 14 in the manner detailed below. The sheaths 28 include a substantially rectangular lower portion 32 and a tapered upper portion 34. The sheaths 28 are illustratively formed from a rigid thermoplastic, such as polypropylene, although other similar materials, such as resilient elastomers, which do not tend to leave marks on the bumper of a vehicle being pushed, may be substituted therefor. The use of thermoplastic materials also provides for a cost-effective means of varying colors as desired.

Figure 4:
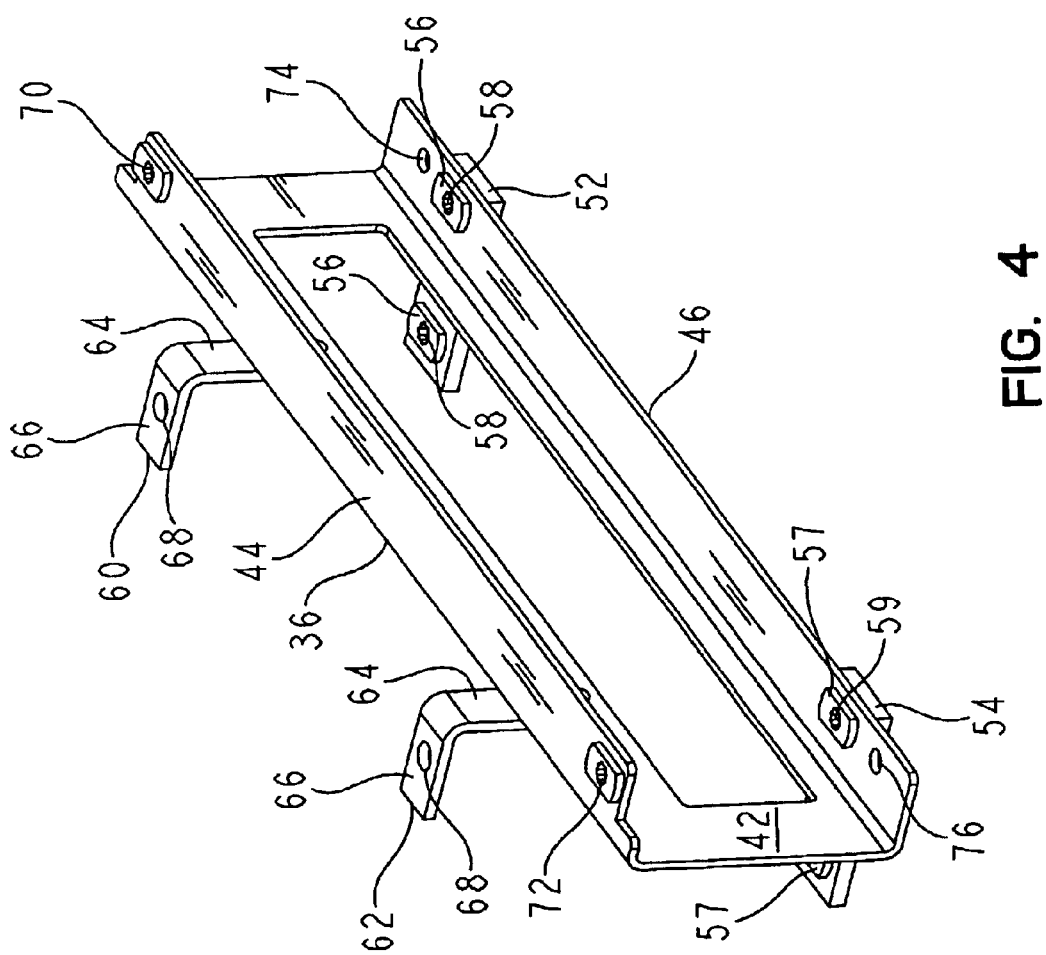
FIG. 4 is a rear perspective view of a front clamping member of the push bumper of FIG. 1.

The clamp assembly 14 includes a main first, or front clamping member 36 and a pair of laterally spaced second, or rear clamping members 38 and 40. With reference to FIGS. 2–5, the front clamping member 36 includes a first, rearwardly facing clamping surface 42 configured to face a front surface 43 of the cross-frame member 16c. The front clamping member 36 further includes first and second vertically spaced flanges 44 and 46 configured to extend above and below top and bottom surfaces 48 and 50 of the cross-frame member 16c. First and second lower mounting members 52 and 54 are fixed to the lower flange 46 of the front clamping member 36 and extend forwardly therefrom. The first and second lower mounting members 52 and 54 include a pair of longitudinally spaced mounting portions 56 and 57, each with an aperture 58 and 59, respectively, formed therethrough (FIG. 4). First and second upper mounting members 60 and 62 extend upwardly and forwardly from proximate the upper flange 44 of the front clamping member 36. Each upper mounting member 60 and 62 is substantially L-shaped and includes a first leg 64 and a second leg 66 coupled to the first leg 64 and extending substantially perpendicular thereto. The second leg 66 includes a mounting aperture 68 formed therein (FIG. 4).

The upper flange 44 of the front clamping member 36 includes a pair of receiving apertures 70 and 72 which are coaxially aligned with a pair of receiving apertures 74 and 76 formed in the lower flange 46. The aligned apertures 70 and 74 are configured to receive a first retaining member, such as a bolt 78, while the aligned apertures 72 and 76 are configured to receive a second retaining member, such as a bolt 80. The apertures 70 and 72 are illustratively threaded, wherein the bolts 78 and 80 pass with clearance through the apertures 74 and 76 and are then threadably received within the apertures 70 and 72, respectively. As illustrated in FIG. 3, the cross-frame member 16c is received intermediate the first clamping surface 42, defined by the front clamping member 36, and the bolts 78 and 80.

Figure 5:
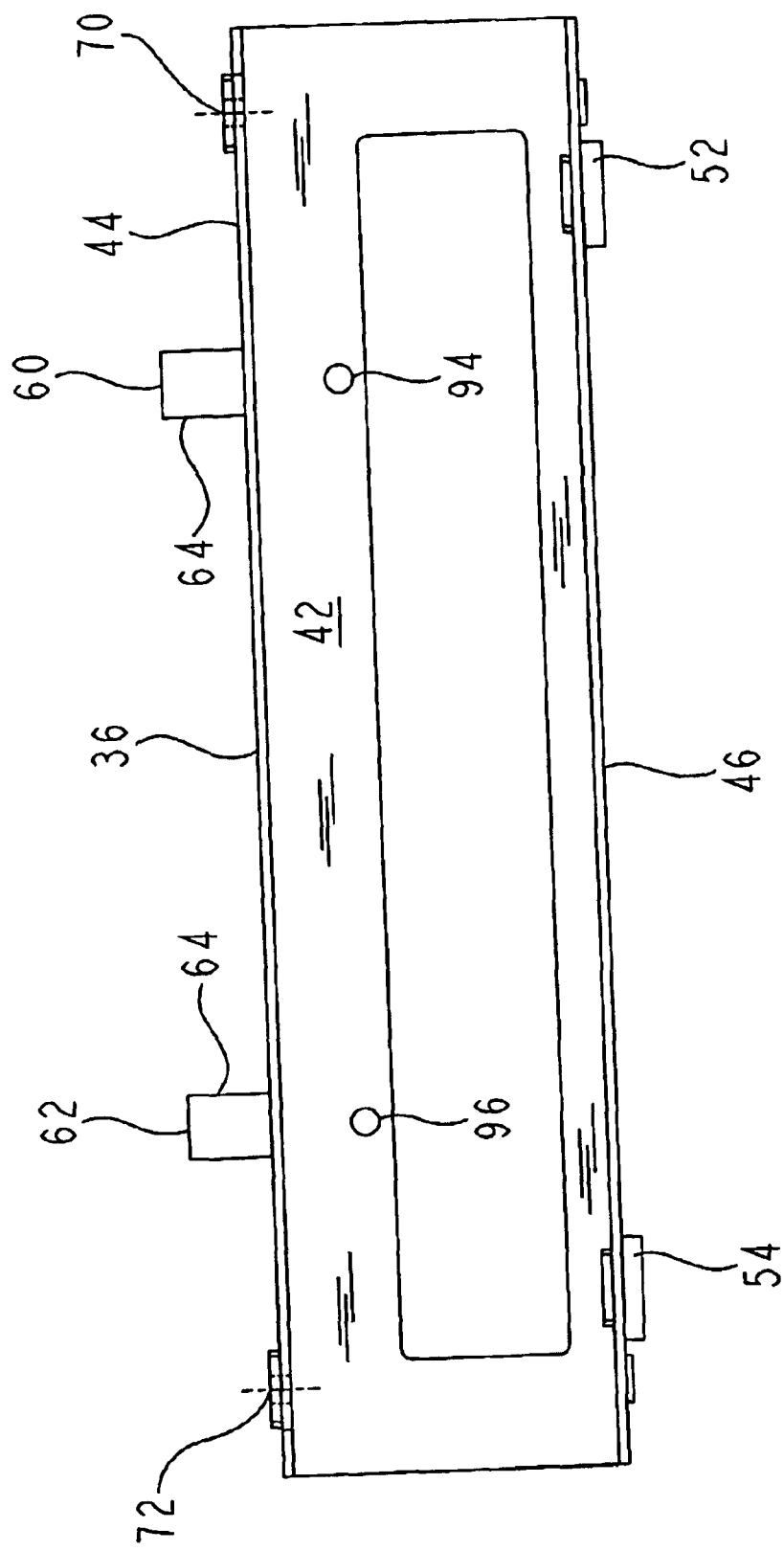
FIG. 5 is a rear elevational view of the front clamping member of FIG. 4.

The first and second rear clamping members 38 and 40 cooperate with the front clamping member 36 to sandwich or clamp the cross-frame member 16c therebetween. Each rear clamping member 38 and 40 comprises a substantially rectangular plate 86 having an aperture 88 formed proximate the center thereof. Each plate 86 defines a second, forwardly facing clamping surface 90 configured to face a rear surface 92 of the cross-frame member 14. The aperture 88 of each plate 86 is configured to be coaxially aligned with apertures 94 and 96 formed through the first clamping surface 42 of the front clamping member 36 (FIG. 5). Fasteners 98 and 100 pass through the apertures 94 and 96 of the front clamping member 36 and through preexisting openings 97 formed within the cross-frame member 16c. The apertures 88 of the plate members 86 are illustratively threaded, such that the fasteners 98 and 100 are threadably received therein and the second clamping surface 90 of the rear clamping members 38 and 40 are drawn toward the first clamping surface 42 of the front clamping member 36. As such, the cross-frame member 16c is clamped between the first and second clamping surfaces 42 and 90.

First and second lower support members or arms 102 and 104 couple the clamp assembly 14 to the push member assembly 19. Each lower support member 102 and 104 is substantially L-shaped and includes a generally horizontal first leg 105 and a generally vertical second leg 106 extending perpendicular to the first leg 105. A rear end of each lower support member 102 and 104 is coupled to the first and second lower mounting members 52 and 54 of the front clamping member 36 by way of fasteners, illustratively bolts 107 and 108, respectively. More particularly, the bolts 107 pass through apertures 110 formed at a rear end of the first leg 105 of the first lower support member 102, and are threadably received within the apertures 58 of the first lower mounting member 52. The bolts 108 are received within apertures 112 formed within a rear end of the first leg 105 of the second lower support member 104 and are threadably received within the apertures 59 of the second lower mounting member 54.

The bolts 107 and 108 illustratively define releasable or breakaway couplings connecting the lower support members 102 and 104 to the front clamping member 36. The bolts 107 and 108 are selected based upon their shear strength which, in turn, depends upon the grade and type of material, and bolt diameter. More particularly, the bolts 107 and 108 are configured to shear or break away upon the application of a force above a predetermined value. In the illustrated embodiment, the bolts 107 and 108 comprise ½-13 hex caps screws, grade 8 with a yellow zinc coated finish. When the push bumper 10 is being used under normal conditions, a force will be transferred from the push member assembly 19 through the lower support members 102 and 104 and to the clamp assembly 16. However, a sudden and large impact upon the push member assembly 19, generating a force above the predetermined value, will cause the bolts 107 and 108 to shear, resulting in a disconnect between the lower support members 102 and 104 and the front clamping member 36.

A front end of each first and second lower support member 102 and 104 is coupled to the first and second push members 20 and 22 by way of nuts 118 and 119 threadably received on the mounting studs 30. More particularly, the second leg 106 of the first and second lower support members 102 and 104 each include apertures 120 and 121, respectively, configured to receive the mounting studs 30 of the push member assembly 19.

First and second upper support members or arms 122 and 124 are positioned generally above the first and second lower support members 102 and 104. A rear end of each upper support member 122 and 124 includes an aperture 126, 108 through which a fastener, illustratively bolt 130, 132 passes and is threadably received within one of the mounting apertures 68 of the upper mounting members 60 and 62, respectively. The front end of each upper support member 122 and 124 likewise includes an aperture 134, 136 which is coaxially aligned with an aperture 138, 140, respectively, formed within an L-shaped mounting member 142. The mounting member 142 is secured to the first and second push members 20 and 22 by nuts 144 threadably received on upper ones of the mounting studs 30 which pass through apertures 146 and 148 formed within the member 142. Fasteners, illustratively bolts 150 and 152, are received within the coaxially aligned apertures 134, 138 and 136, 140.

In a manner detailed above with respect to the bolts 107 and 108, the bolts 150 and 152 received within the apertures 134, 138 and 136, 140 illustratively define releasable or breakaway couplings which are configured to shear upon the application of a force exceeding a predetermined value. As such, sudden impact upon the push member assembly 19 will cause the bolts 150 and 152 to shear and thereby disconnect the push member assembly 19 from the clamp assembly 16. It should be appreciated that the bolts 130 and 132 may likewise define breakaway couplings. Illustratively, the bolts 130, 132 and 150, 152 comprise ½-13 hex caps screws, grade 8 with a yellow zinc coated finish.

With further reference to FIGS. 1 and 3, a portion of each first and second lower support member 102 and 104 intermediate the rear end and the front end passes through a first set of pre-existing openings 154 and 156 formed within the bumper cover or fascia 21 of the vehicle 12. More particularly, the lower support members 102 and 104 extend from the clamp assembly 16 below the bumper 17, through the openings 154 and 156 formed in a lower portion of the fascia 21, and couple to the push member assembly 19. Likewise, a portion of each first and second upper support members 122 and 124 intermediate the rear end and the front end passes through a second set of pre-existing openings 158 and 160 formed within the fascia 21 of the vehicle 12. More particularly, the upper support members 122 and 124 extend from the clamp assembly 16 above the bumper 17, through the openings 158 and 160 formed above the openings 154 and 156 and immediately below the vehicle grille 162. After passing through the openings 154 and 156, the upper support members couple to the push member assembly 19.

Installation of the push bumper 10 begins with initial preparation of the vehicle 12. More particularly, the front hood of the vehicle 12 is opened and secured in a raised position. Next, the vehicle's dust shroud (not shown) is removed. From the bottom of the vehicle 12, the front clamping member 36 is coupled to the cross-frame member 16c in front of the vehicle's radiator 164 (FIGS. 3 and 8). The retaining members, such as bolts 78 and 80, are next installed within the front clamping member 36. More particularly, the bolts 78 and 80 are passed upwardly through apertures 70 and 72 and then threadably received within apertures 74 and 76, respectively. The bolts 78 and 80 are positioned behind the cross-frame member 16c and in front of the radiator 164.

In the next installation step, the first and second rear clamping members 38 and 40 are positioned behind the front clamping member 36 and in front of the radiator 164. Bolts 98 and 100, pass through apertures 94 and 96 from the front of the front clamping member 36 and through pre-existing openings 97 formed in the cross-frame member 16c. The bolts 98 and 100 are threadably received within apertures 88 of the rear clamping members 38 and 40. Next, the first and second upper support members 122 and 124 are inserted through openings 158 and 160 between the vehicle grille 162 and front fascia 21. Bolts 130 and 132 are passed through apertures 126 and 128 and are threadably received within apertures 68 of the upper mounting members 60 and 62, respectively, thereby coupling the upper support members 122 and 124 to the front clamping member 36.

Next, the first and second lower support members 102 and 104 are coupled to the front clamping member 36. More particularly, bolts 107 pass through apertures 110 formed within first lower support member 102, and are threadably received within apertures 58 of the first lower mounting member 52. Bolts 108 are received within apertures 112 formed within second lower support member 104 and are threadably received within apertures 59 of the second lower mounting portion 54.

The L-shaped mounting member 142 is next secured to the first and second upper support members 122 and 124 by bolts 150 and 152 passing through apertures 138 and 140 and threadably received within apertures 134 and 136, respectively. Next, the first and second push members 20 and 22 are secured to the first and second lower support members 102 and 104 and mounting member 142 by passing mounting studs 30 through apertures 120, 121 and 146, 148, respectively. Nuts 118, 119 and 144 are received on studs 30.

Finally, all fasteners are tightened securely. The vehicle's dust shroud is then replaced, thereby completing the installation. The vehicle's hood may be lowered and secured.

Turning now to FIGS. 6–10, an alternative embodiment push bumper 210 is illustrated. In the following detailed description, it should be noted that similar reference numerals refer to similar components as described above with respect to the embodiment of FIGS. 1–5. Again, for illustrative purposes the vehicle 12 used in combination with the push bumper 210 is a 2003 Ford Crown Victoria automobile. However, it should be appreciated that the push bumper 210 of the present invention may find equal applicability with other vehicles. The push bumper 210 includes a clamp assembly 214 which is configured to couple to a member, such as front cross-frame member 16c, of a frame assembly 15.

A vehicle push member assembly 219 is coupled to the clamp assembly 214 and includes first and second laterally spaced vertical push members 220 and 222. As with the push bumper 10 of FIGS. 1–5, a bumper cover or fascia 21 of the vehicle 12 is positioned intermediate the bumper 17 and the push member assembly 219. The first and second push members 220 and 222 are coupled to a horizontal connecting member, illustratively a shelf 224. More particularly, the push members 220 and 222 each include a stanchion 226 having a plurality of slots 225 configured to receive a plurality of tabs 227 coupled to opposing ends of the shelf 224. Fasteners, illustratively bolts 228, secure the opposing ends of the shelf 224 to the stanchions 226 of the push members 220 and 222. Opposing ends of an upper stabilizing bar 229 likewise includes tabs 230 configured to be received within slots 231 formed within the stanchions 226 of each push member 220 and 222. The stabilizing bar 230 is secured to the stanchions 226 by fasteners, such as bolts 232. Protective trim 233 is coupled to an outer edge 234 of each stanchion 226. Illustratively, the trim 233 is formed from a elastomeric material, although other materials, such as thermoplastics, may be substituted therefor.

The tabs 227 and 230 together with the bolts 228 and 232 define a releasable coupling such that the lateral distance between the push members 220 and 222 may be adjusted. More particularly, the bolts 228 and 232 may be removed, and the tabs 227 and 230 of the shelf 224 and the stabilizing bar 230 withdrawn from the slots 225 and 231 of the stanchions 226, respectively. Once removed from the push member assembly 219, the shelf 224 and the stabilizing bar 230, having a first width (W) (FIG. 8) between respective opposing ends, may be replaced with a second shelf 224' and a second stabilizing bar 230' having a second width between respective opposing ends. The second width may be different from the first width such that the lateral distance between the push members 220 and 222 is variable.

Figure 6:
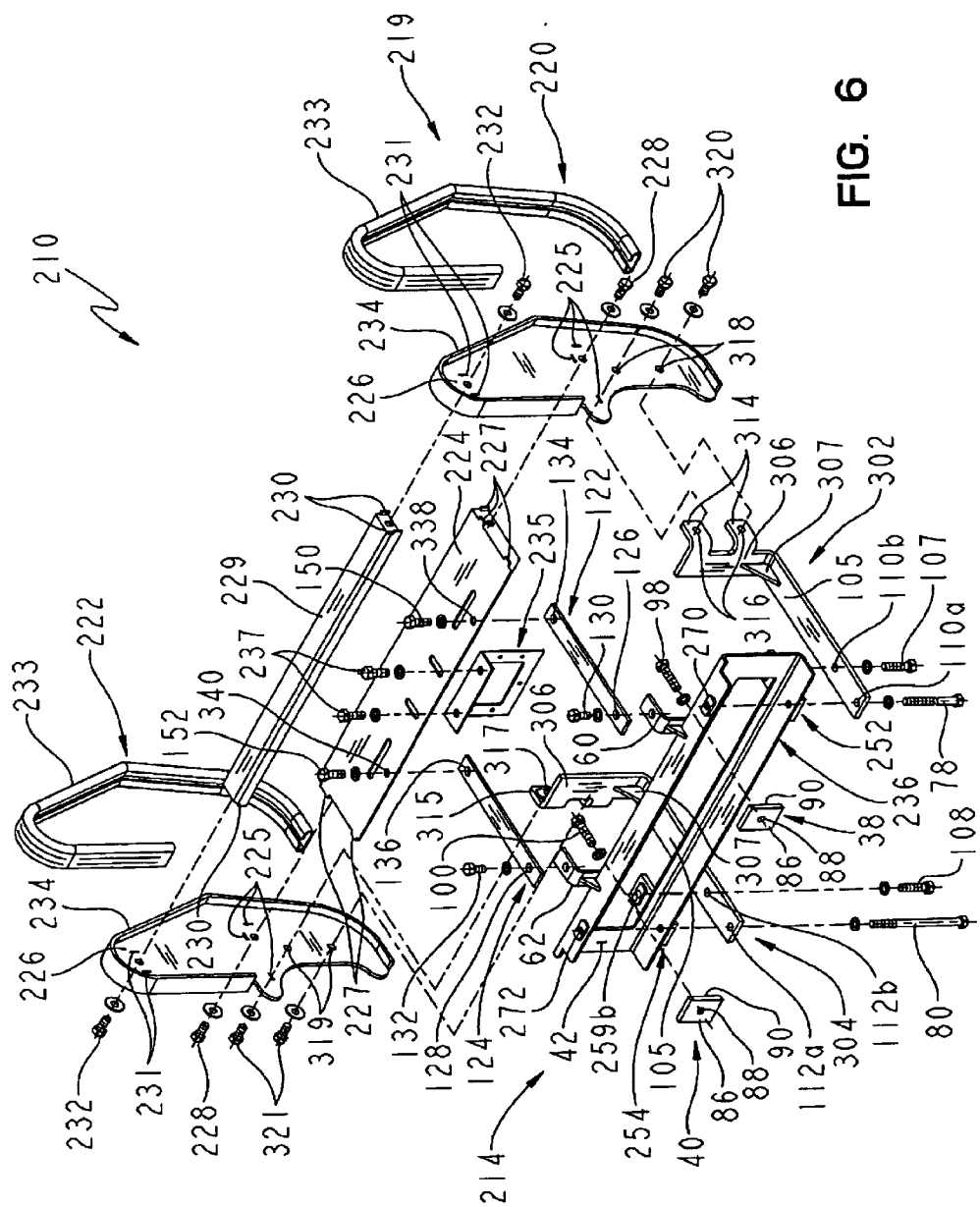
FIG. 6 is an exploded perspective view of a further illustrative embodiment push bumper according to the present invention.

The shelf 224 may be utilized to support accessories, such as fog lights, sirens, etc. (not shown). As shown in FIG. 6, a speaker bracket 235 may extend downwardly from the shelf 224 and is configured to support a speaker (not shown). Fasteners, such as bolts 237, are used to couple the speaker bracket 235 to the shelf 224.

Figure 9:
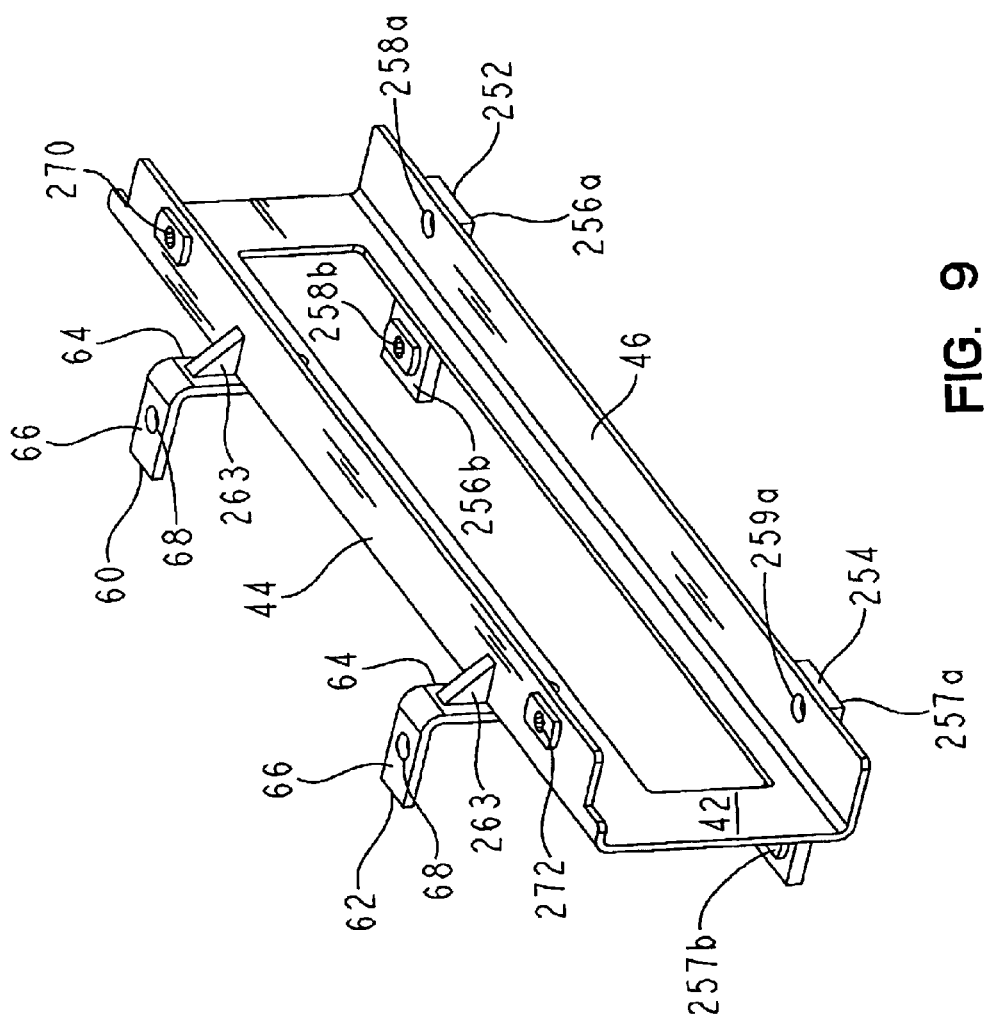
FIG. 9 is a rear perspective view of a front clamping member of the push bumper of FIG. 6.
Figure 10:
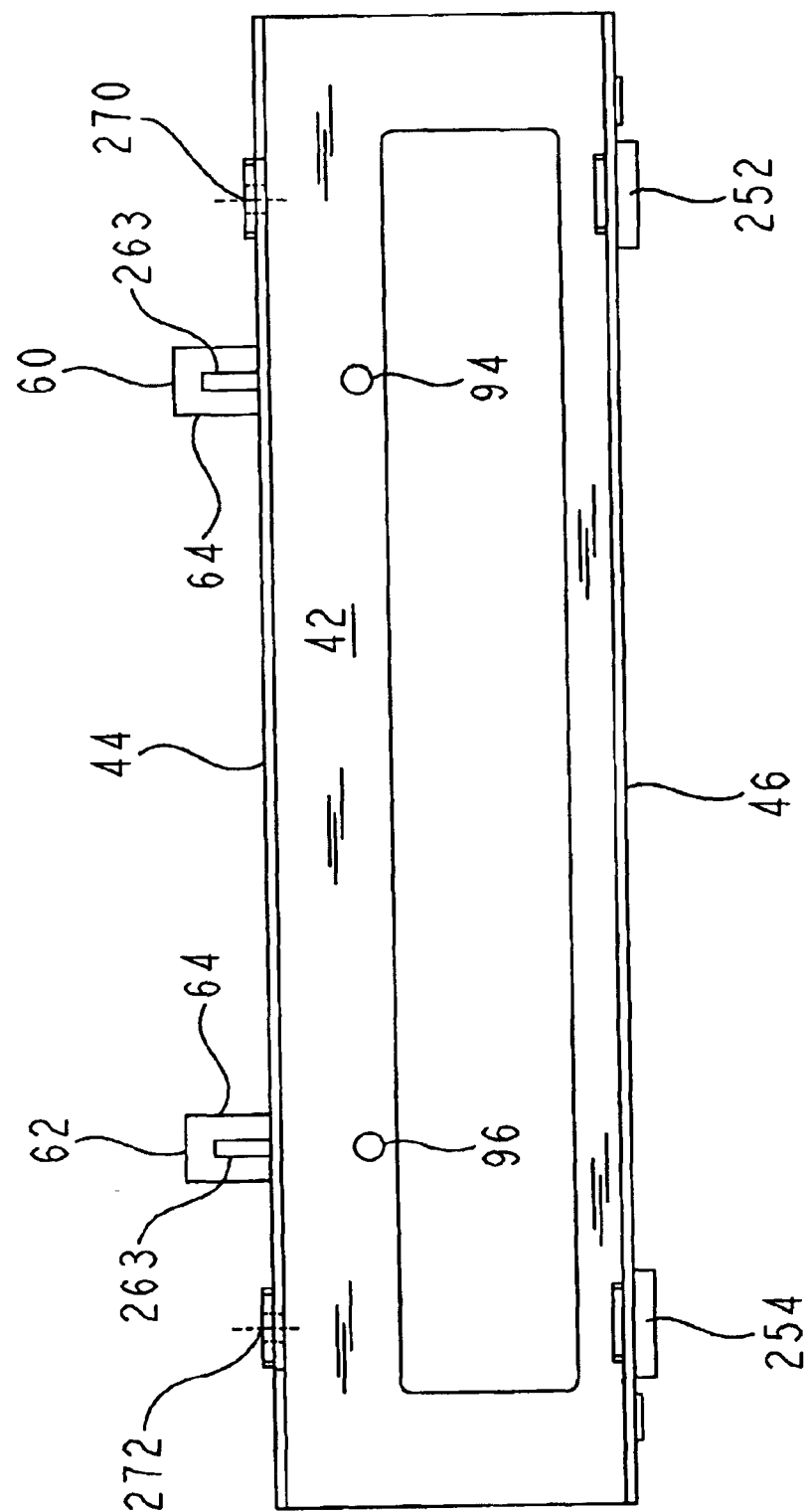
FIG. 10 is a rear elevational view of the front clamping member of FIG. 9.

The clamp assembly 214 of the present embodiment is substantially similar to the clamp assembly 14 detailed above with respect to the push bumper 10 of FIGS. 1–5. The clamp assembly 214 includes a main first, or front clamping member 236 and a pair of laterally spaced second, or rear clamping members 38 and 40. With further reference to FIGS. 6–10, the front clamping member 236 includes a first, rearwardly facing clamping surface 42 configured to face a front surface 43 of the cross-frame member 16c. First and second lower mounting members 252 and 254 are fixed to a lower flange 46 of the front clamping member 236 and extend forwardly therefrom. Each of the first and second lower mounting members 252 and 254 includes a pair of longitudinally spaced mounting portions 256a, 256b and 257a, 257b, respectively. A pair of apertures 258a, 258b and 259a, 259b are formed within the mounting portions 256a, 256b and 257a, 257b, respectively (FIG. 9). First and second upper mounting members 60 and 62 extend upwardly and forwardly from proximate an upper flange 44 of the front clamping member 236. A strengthening web 263 is illustratively coupled intermediate each upper mounting member 60, 62 and the upper flange 44 of the front clamping member 236.

Figure 7:
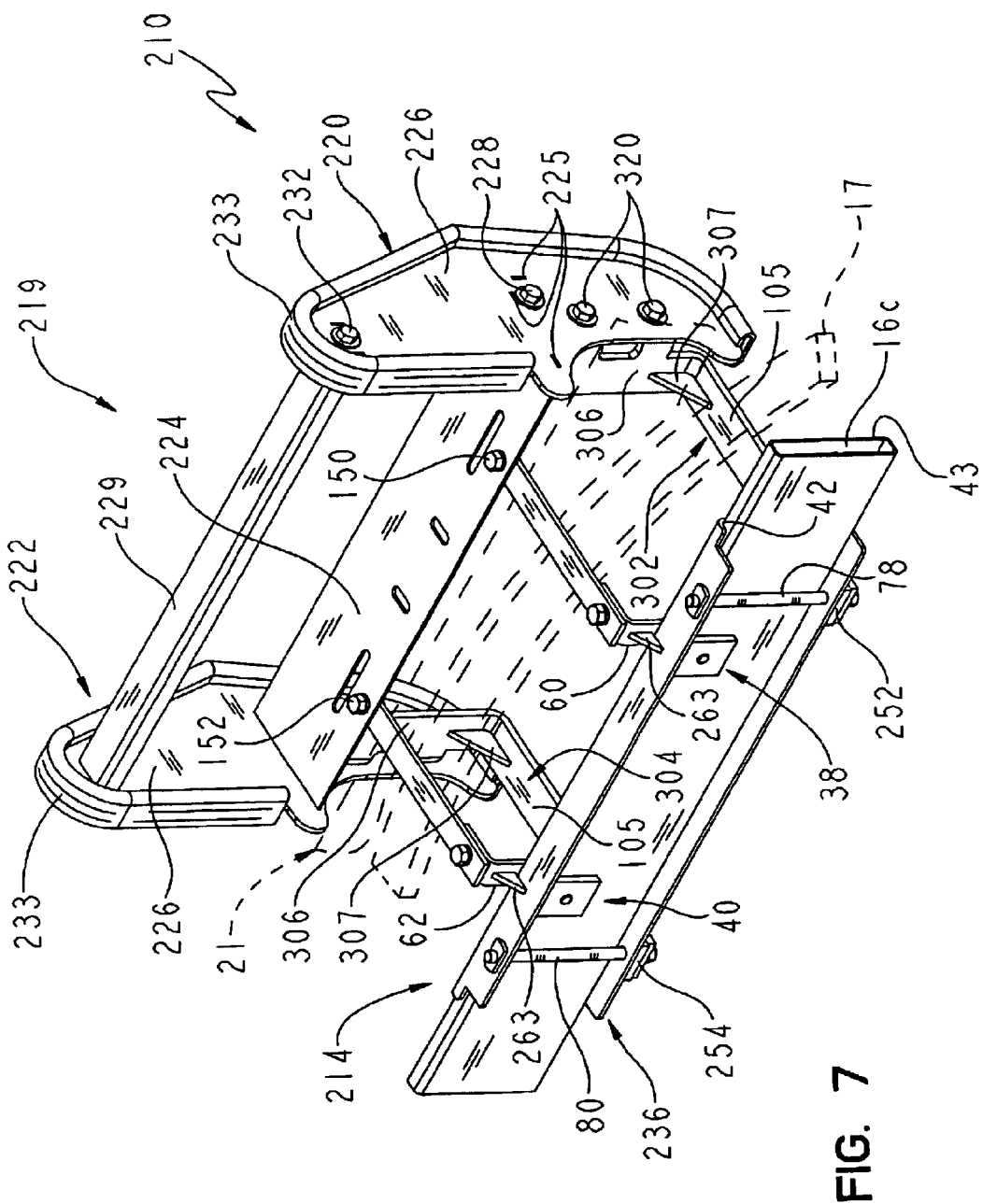
FIG. 7 is a rear perspective view of the push bumper of FIG. 6, illustrating the push bumper coupled to a laterally extending cross-frame member and straddling conventional front bumper of a vehicle.

The upper flange 44 of the front clamping member 236 includes a pair of receiving apertures 270 and 272 which are coaxially aligned with respective apertures 258a and 259a of the mounting portions 256a and 257a, respectively. The aligned apertures 258a and 270 are configured to receive a first retaining member, such as a bolt 78, while the aligned apertures 259a and 272 are configured to receive a second retaining member, such as a bolt 80. The apertures 270 and 272 are illustratively threaded, wherein the bolts 78 and 80 pass with clearance through the apertures 258a and 259a and are then threadably received within the apertures 270 and 272, respectively. As illustrated in FIGS. 7 and 8, the cross-frame member 16c is received intermediate the first clamping surface 42, defined by the front clamping member 236, and the bolts 78 and 80.

As with the clamp assembly 14 detailed above with respect to the push bumper 10 of FIGS. 1–5, the first and second rear clamping members 38 and 40 cooperate with the front clamping member 236 to sandwich or clamp the cross-frame member 16c therebetween.

First and second lower support members 302 and 304 couple the clamp assembly 214 to the push member assembly 219. Each lower support member 302 and 304 is substantially L-shaped and includes a generally horizontal first leg 105 and a generally vertical second leg 306 extending perpendicular to the first leg 105. A strengthening web 307 may be positioned intermediate each first leg 105 and second leg 306. A rear end of each lower support member 302 and 304 is coupled to the first and second lower mounting members 252 and 254 of the front clamping member 236. Bolts 78 and 80 pass through apertures 110a and 112a formed at the rear end of the first legs 105 of the lower support members 302 and 304, respectively. As detailed above, the bolts 78 and 80 are threadably received within the apertures 270 and 272 of the first clamping member 236. Additionally, a fastener, such as bolt 107, passes through aperture 110b and is threadably received within aperture 258b of the first lower mounting member 252. Likewise, a fastener, such as bolt 108, passes through aperture 112b and is threadably received within aperture 259b of the second lower mounting member 254.

A front end of each first and second lower support member 302 and 304 is coupled to the first and second push members 220 and 222. The second leg 306 of the first and second lower support members 302 and 304 each include a pair of mounting tabs 314 and 315 including internally threaded apertures 316 and 317, respectively. A pair of apertures 318 and 319 are formed within the stanchions 226 of each push member 220 and 222. A pair of bolts 320 and 321 are configured to pass through the apertures 318 and 319 of the push members 220 and 222 and to be threadably received within the apertures 316 and 317, respectively, thereby securing the mounting tabs 314 and 315 to an inner surface of each stanchion 226.

The bolts 320 and 321 illustratively define releasable or breakaway couplings connecting the lower support members 302 and 304 to the front clamping member 236. The bolts 320 and 321 are selected based upon their shear strength which, in turn, depends upon the grade and type of material, and bolt diameter. More particularly, the bolts 320 and 321 are configured to shear or break away upon the application of a force above a predetermined value. In the illustrated embodiment, the bolts 320 and 321 comprise ½-13 hex caps screws, grade 8 with a yellow zinc coated finish. When the push bumper 210 is being used under normal conditions, a force will be transferred from the push member assembly 219 through the lower support members 302 and 304 and to the clamp assembly 216. However, a sudden and large impact upon the push member assembly 219, generating a force above the predetermined value, will cause the bolts 320 and 321 to shear, resulting in a disconnect between the lower support members 302 and 304 and the front clamping member 236. It should be noted that the bolts 78, 107 and 80, 108 may similarly be selected to define a breakaway coupling in the manner detailed above.

First and second upper support members 122 and 124 are positioned generally above the first and second lower support members 302 and 304. A rear end of each upper support member 122 and 124 includes an aperture 126, 128 through which a fastener, illustratively bolt 130, 132 passes and is threadably received within one of the mounting apertures 68 of the upper mounting members 60 and 62, respectively. The front end of each upper support member 122 and 124 likewise includes an aperture 134, 136 which is coaxially aligned with an aperture 338, 340, respectively, formed within the shelf 224. Fasteners, illustratively bolts 150 and 152, are received within the coaxially aligned apertures 134, 338 and 136, 340, respectively.

In a manner detailed above with respect to the bolts 320 and 321, the bolts 150 and 152 received within the apertures 134, 338 and 136, 340 illustratively define releasable or breakaway couplings which are configured to shear upon the application of a force exceeding a predetermined value. As such, sudden impact upon the push member assembly 19 will cause the bolts 150 and 152 to shear and thereby disconnect the push member assembly 19 from the clamp assembly 16. It should be appreciated that the bolts 130 and 132 may likewise define breakaway couplings. Illustratively, the bolts 130, 132 and 150, 152 comprise ½-13 hex caps screws, grade 8 with a yellow zinc coated finish.

As with the push bumper 10 illustrated in FIGS. 1 and 3, a portion of each first and second lower support member 302 and 304 intermediate the rear end and the front end passes through a first set of pre-existing openings 154 and 156 formed within the bumper cover or fascia 21 of the vehicle 12. More particularly, the lower support members 302 and 304 extend from the clamp assembly 216 below the bumper 17, through the openings 154 and 156 formed in a lower portion of the fascia 21, and couple to the push member assembly 219. Likewise, a portion of each first and second upper support members 122 and 124 intermediate the rear end and the front end passes through a second set of pre-existing openings 158 and 160 formed within the fascia 21 of the vehicle 12. More particularly, the upper support members 122 and 124 extend from the clamp assembly 216 above the bumper 17, through the openings 158 and 160 formed above the openings 154 and 156 and immediately below the vehicle grille 162. After passing through the openings 154 and 156, the upper support members 122 and 124 couple to the push member assembly 219.

Installation of the push bumper 210 begins with initial preparation of the vehicle 12. More particularly, the front hood of the vehicle 12 is opened and secured in a raised position. Next, the vehicle's dust shroud (not shown) is removed. From the bottom of the vehicle 12, the front clamping member 236 is coupled to the cross-frame member 16c in front of the vehicle's radiator 164 (FIGS. 7 and 8).

More particularly, the first and second rear clamping members 38 and 40 are positioned behind the front clamping member 36 and in front of the radiator 164. Fasteners, such as bolts 98 and 100, pass through apertures 94 and 96 from the front of the front clamping member 36 and through pre-existing openings 97 formed in the cross-frame member 16c. The bolts 98 and 100 are threadably received within apertures 88 of the rear clamping members 38 and 40. Next, the first and second lower support members 102 and 104 are inserted from outside the vehicle 12 through the openings 154 and 156 within the front fascia 21. The support members 102 and 104 are then coupled to the front clamping member 236. More particularly, bolts 107 and 108 are passed through apertures 110b and 112b formed within lower support members 302 and 304, respectively. The bolts 107 and 108 are then threadably received within apertures 258b and 259b of lower mounting members 252 and 254.

The retaining members, such as bolts 78 and 80, are next installed within the front clamping member 236. More particularly, the bolts 78 and 80 are passed upwardly through apertures 110a and 112a of the lower support members 302 and 304, through apertures 258a and 259a of front clamping member 236, and then threadably received within apertures 270 and 272, respectively. The bolts 78 and 80 are positioned behind the cross-frame member 16c and in front of the radiator 164. Next, the first and second upper support members 122 and 124 are inserted through openings 158 and 160 between the vehicle grille 162 and front fascia 21. Bolts 130 and 132 are passed through apertures 126 and 128 and are threadably received within apertures 68 of the upper mounting members 60 and 62, respectively, thereby coupling the upper support members 122 and 124 to the front clamping member 36.

Next, the first and second push members 220 and 222 are secured to the first and second lower support members 302 and 304 by bolts 320 and 321 coupling respective stanchions 226 to mounting tabs 314 and 315.

Finally, all fasteners are tightened securely. The vehicle's dust shroud is then replaced, thereby completing the installation. The vehicle's hood may be lowered and secured.

Figure 11:
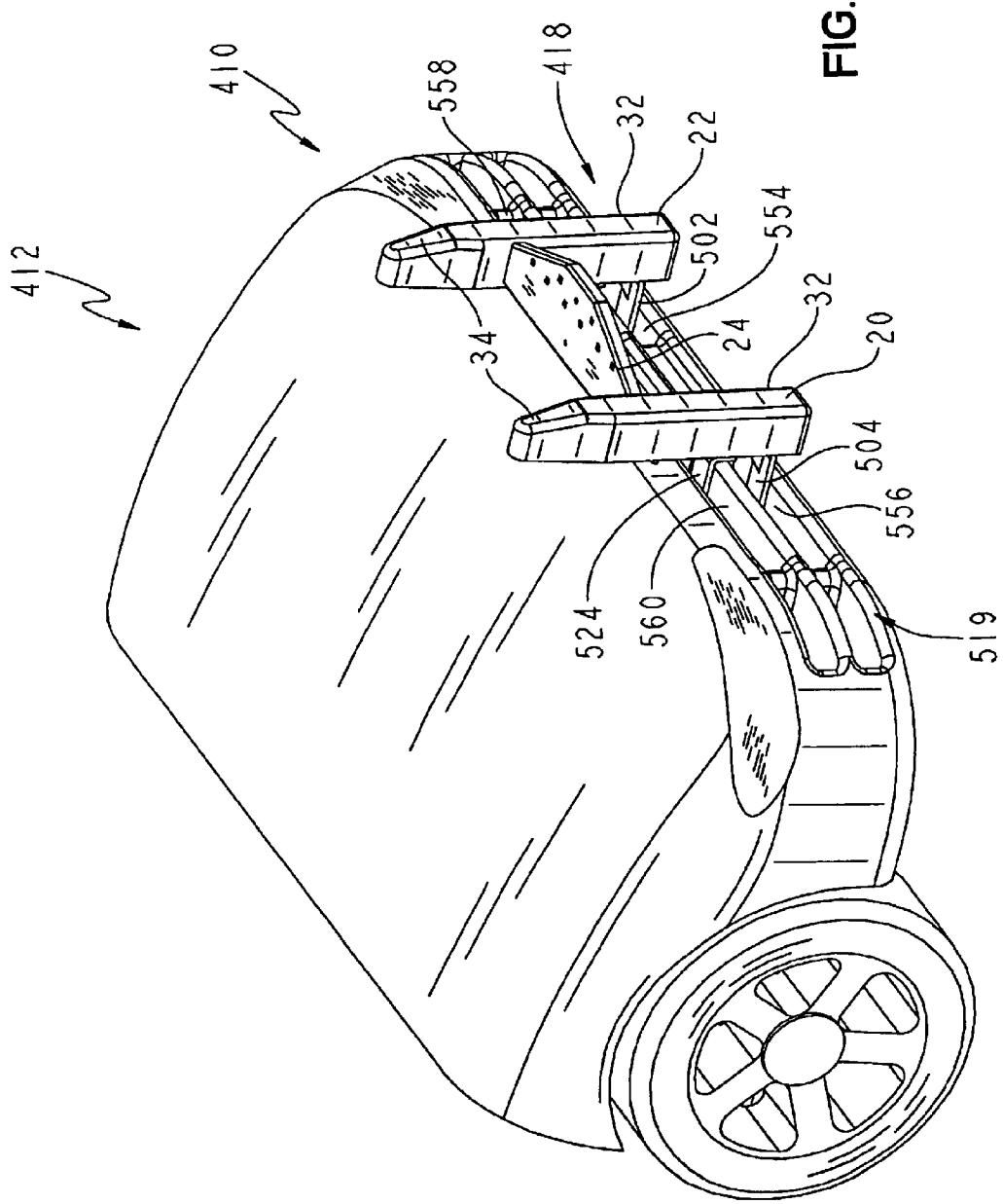
FIG. 11 is a perspective view of another embodiment push bumper according to the present invention supported adjacent the front of a vehicle.
Figure 12:
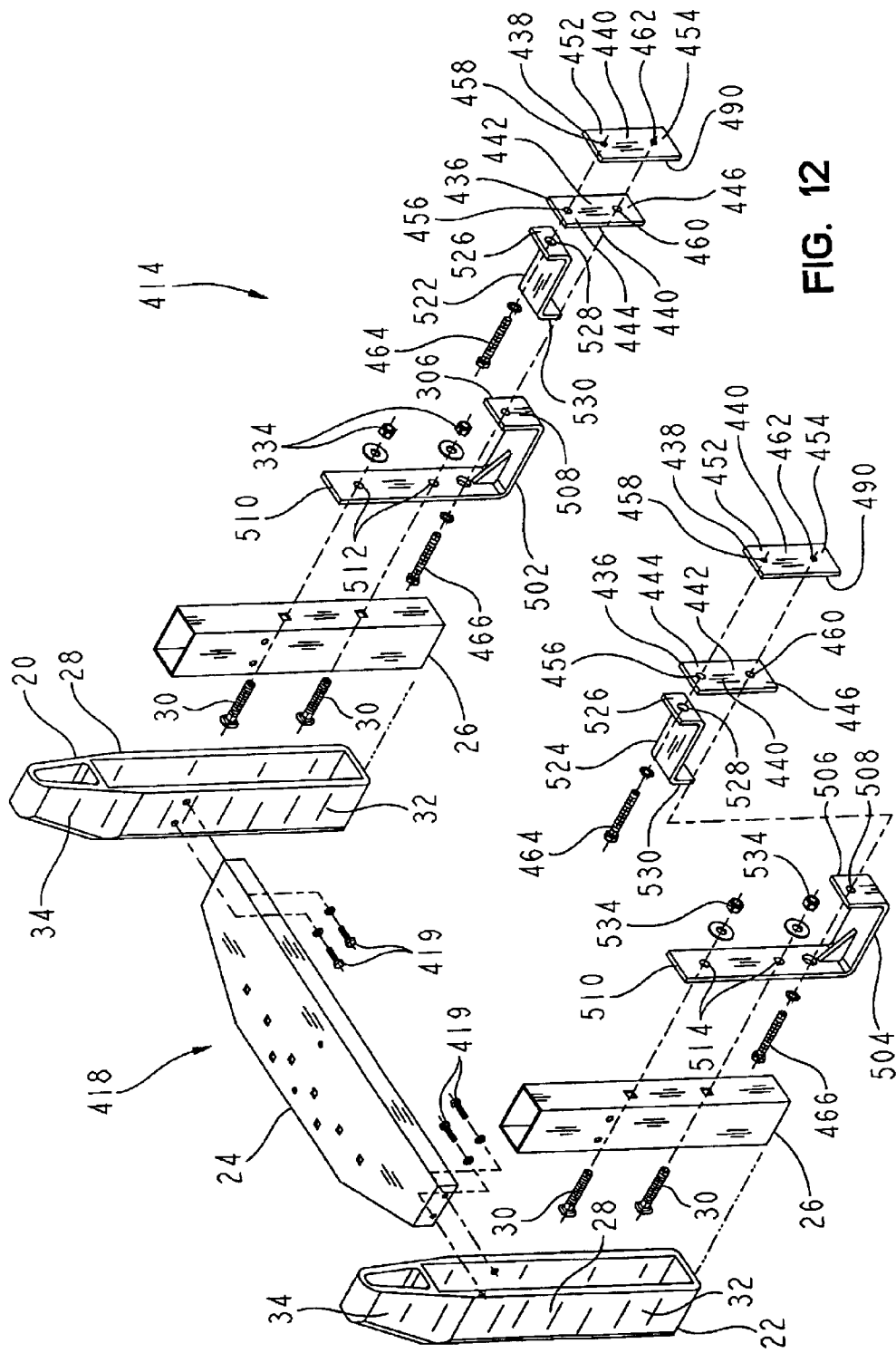
FIG. 12 is an exploded perspective view of the push bumper of FIG. 11.
Figure 13:
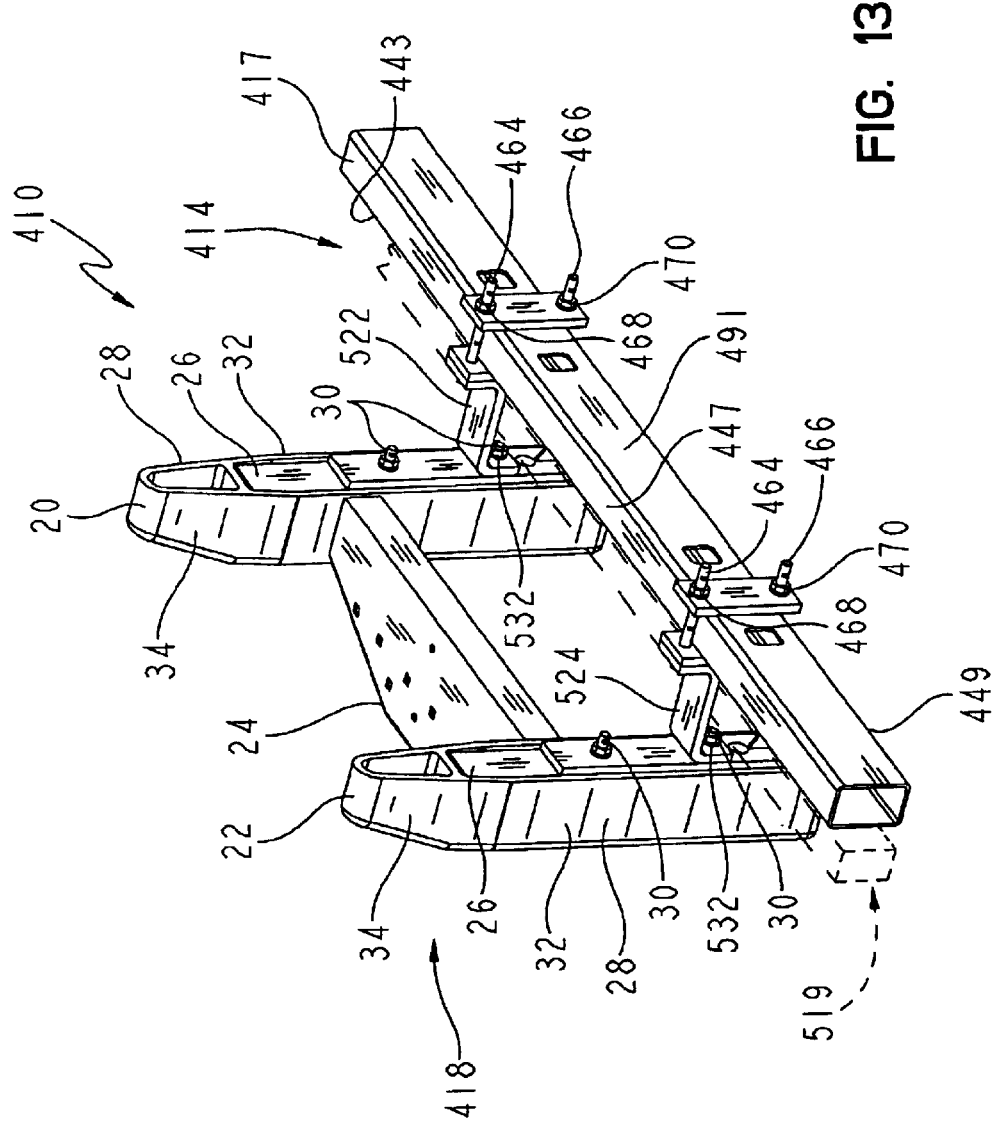
FIG. 13 is a rear perspective view the push bumper of FIG. 11, illustrating the push bumper coupled to a conventional front bumper of the vehicle.

Turning now to FIGS. 11–13, an alternative embodiment push bumper 410 is illustrated. In the following detailed description, it should be noted that similar reference numerals refer to similar components as described above with respect to the embodiment of FIGS. 1–5. The push bumper 410 is configured to couple to the conventional bumper 417 of a vehicle 412 (FIG. 13). While the illustrated vehicle 412 used in combination with the push bumper 410 is a 2003 Dodge Intrepid automobile, it should be appreciated that the push bumper 410 of the present invention may find equal applicability with other vehicles.

The push member assembly 419 of the present embodiment is substantially identical to the push member assembly 19 as identified above. More particularly, the push member assembly 419 includes first and second laterally spaced push members 20 and 22 coupled to a shelf 24. Conventional fasteners, such as bolts 420 may be utilized to connect the first and second push members 20 an 22 to the shelf 24. Each push member 20 and 22 includes a substantially rectangular column 26 received within a sheath 28. Mounting bolts or studs 30 are coupled to the columns 26 and extend rearwardly therefrom.

A clamp assembly 414 is coupled to the push member assembly 418. The clamp assembly 414 includes a pair of front clamping members 436 and a pair of rear clamping members 438. The front and rear clamping members 436 and 438 are substantially identical and are generally comprised of substantially planar plates 440. The plates 440 of the front clamping members 436 each define a first clamping surface 442 configured to face a front surface 443 of the vehicle bumper 417. The plate 440 of each rear clamping member 438 likewise includes a second clamping surface 490 which is configured to face a rear surface 491 of the vehicle bumper 417.

The plate 440 of each front clamping member 436 includes upper and lower mounting portions 444 and 446 which extend above the upper and lower surfaces 447 and 449 of the vehicle bumper 417, respectively. Likewise, the plate 440 of each rear clamping member 438 includes upper and lower mounting portions 452 and 454 which are configured to extend above and below the upper and lower surfaces 447 and 449 of the vehicle bumper 417, respectively. The upper mounting portion 444 of the front clamping member 436 includes an aperture 456 which is configured to be coaxially aligned with an aperture 458 formed in the upper mounting portion 452 of the rear clamping member 438. Likewise, the lower mounting portion 446 of the front clamping member 436 includes an aperture 460 which is configured to be coaxially aligned within with an aperture 462 formed in the lower mounting portion 454 of the rear clamping member 438. Upper and lower fasteners 464 and 466 are configured to be received within the coaxially aligned apertures 456, 458 and 460, 462, respectively, such that the bumper 417 is essentially clamped, or sandwiched between, the first clamping surface 442 and the second clamping surface 490. Nuts 468 and 470 may be threadably received on the upper and lower fasteners 464 and 466 to secure the rear clamping members 438 relative to the front clamping members 436. Alternatively, the apertures 458 and 462 may be threaded such that the rear clamping members 238 threadably receive the fasteners 464 and 466.

First and second lower support members 502 and 504 each include a rear end 506 having an aperture 508 coaxially aligned with the apertures 460 and 462 of the front and rear clamping members 436 and 438, and which receives the fastener 266. A front end 510 of each lower support member 502 and 504 includes a pair of apertures 512 and 514, respectively, which receive the threaded studs or bolts 30 of the first or second push member 20, 22. First and second upper support members 522 and 524 are positioned generally above the first and second lower support members 502 and 504 and include a rear end 526 having an aperture 528 configured to be coaxially aligned with the apertures 456 and 458 of the upper mounting portions 444 and 452 of the front and rear clamping members 436 and 438 and to receive the fasteners 464. A front end 530 of each upper support member 522 and 524 includes an aperture 532 (FIG. 13) coaxially aligned with the lower ones of the apertures 512 and 514 of the lower support members 502 and 504, and through which one of the bolts 30 is received. A conventional nut 534 is threadably received on the bolt 30 thereby fastening the front end 530 of the upper support member 522 and 524 to the front end 510 of the lower support member 502 and 504 and the push member 20, 22.

With further reference to FIGS. 11 and 13, a portion of each first and second lower support member 502 and 504 intermediate the rear end 506 and the front end 510 passes through a first set of pre-existing openings 554 and 556 formed within the bumper cover or fascia 519 of the vehicle 412. Likewise, a portion of each first and second upper support member 522 and 524 intermediate the rear end 526 and the front end 530 passes through a second set of pre-existing openings 558 and 560 formed within the fascia 519 and positioned generally above the openings 554 and 556.

Installation of the push bumper 410 begins with initial preparation of the vehicle 412. More particularly, the front hood of the vehicle 412 is opened and secured in a raised position. Next, the front and rear clamping members 436 and 438 and the upper support members 522 and 524 are coupled to the front bumper of the vehicle 412. More particularly, the upper support members 522 and 524 are positioned between the front fascia 519 and the bumper 417. The upper support members 522 and 524 are secured to front and rear clamping members 436 and 438 through bolts 464 and 466.

Next, the first and second lower support members 502 and 504 are coupled to the front and rear clamping members 436 and 438 through bolts 464 and 466. The push member assembly 418 is then secured to the lower support members 502 and 504 by bolts 30 passing through the columns 26. The shelf 24 is secured to the push members 20 and 22 through bolts 419. Finally, the sheaths 28 receive the columns 26 to complete the push bumper 410.

Although the invention has been described in detail with reference to certain preferred embodiments, variations and modifications exist within the spirit and scope of the invention as described and defined in the following claims.

What is claimed is:

1. A push bumper apparatuse configured to be coupled to a vehicle including a bumper, a frame assembly positioned in longitudinally spaced relation to the bumper, and a fascia positioned in longitudinally spaced relation in front of the bumper, the push bumper apparatus comprising:
   at least one push member;
   a front clamping member including a first clamping surface configured to face a front surface of one of the bumper and the frame assembly;
   a rear clamping member including a second clamping surface configured to face a rear surface of one of the bumper and the frame assembly;
   a fastener connecting the front clamping member and the rear clamping member such that the one of the bumper and the frame assembly is clamped between the first clamping surface and the second clamping surface; and
   a support member configured to secure one of the front clamping member and the rear clamping member to the push member and to pass through a pre-existing opening formed within the fascia, without requiring new openings to be formed through any of the bumper, the frame assembly, and the fascia.

2. The push bumper apparatus of claim 1, wherein the at least one push member comprises a first vertical push member, and a second vertical push member positioned in laterally spaced relation to the first vertical push member, and wherein a connecting member is coupled to and extends between the first and second vertical push members.

3. The push bumper apparatus of claim 2, wherein the connecting member is a horizontal shelf configured to receive at least one accessory thereon.

4. The push bumper apparatus of claim 3, further comprising a speaker bracket extending downwardly from the shelf.

5. The push bumper apparatus of claim 2, wherein the first and second vertical push members are releasably coupled to the connecting member such that the lateral spacing between the first and second vertical push members may be varied by replacing the connecting member with a second connecting member having a different width.

6. The push bumper apparatus of claim 1, wherein the front clamping member includes top and bottom retaining portions configured to extend beyond top and bottom surfaces of one of the bumper and the frame assembly.

7. The push bumper assembly of claim 1, wherein the frame assembly includes a laterally extending cross-frame member, the first clamping surface of the front clamping member is configured to face a front surface of the cross-frame member, and the second clamping surface of the rear clamping member is configured to face a rear surface of the cross-frame member, such that the cross-frame member is clamped therebetween.

8. The push bumper assembly of claim 1, further comprising a breakaway coupling coupled to the support member and configured to disconnect the push member from the one of the front clamping member and the rear clamping member upon the application of a predetermined force to the push member.

9. A push bumper apparatus configured to be coupled to a frame assembly of a vehicle, the vehicle including a bumper positioned in longitudinally spaced relation to the frame assembly, and a fascia positioned in longitudinally spaced relation in front of the bumper, the push bumper apparatus comprising:
   a push member;
   a coupler configured to be supported by the frame assembly;

a lower support member configured to secure the coupler to the push member and extending vertically below the bumper from the coupler to the push member; and an upper support member configured to secure the coupler to the push member and extending vertically above the bumper from the coupler to the push member.

10. The push bumper apparatus of claim 9, wherein the coupler comprises:

a front clamping member including a first clamping surface configured to face a front surface of the frame assembly;

a rear clamping member including a second clamping surface configured to face a rear surface of the frame assembly; and a fastener connecting the front clamping member and the rear clamping member such that the frame assembly is clamped intermediate the front clamping surface and the rear clamping surface.

11. The push bumper apparatus of claim 9, wherein the push member comprises a first vertical push member, the push bumper apparatus further comprising a second vertical push member positioned in laterally spaced relation to the first vertical push member, and a connecting member coupled to and extending between the first and second vertical push members.

12. The push bumper apparatus of claim 11, wherein the connecting member is a horizontal shelf configured to receive at least one accessory thereon.

13. The push bumper apparatus of claim 11, wherein the first and second vertical push members are releasably coupled to the connecting member such that the lateral spacing between the first and second vertical push members may be varied by replacing the connecting member with a second connecting member having a different width.

14. The push bumper apparatus of claim 9, wherein the lower support member passes through a first pre-existing opening formed within the fascia, and the upper support member passes through a second pre-existing opening formed within the fascia in spaced relation to the first pre-existing opening.

15. The push bumper assembly of claim 9, further comprising a breakaway coupling coupled to each of the first and second support members, the breakaway coupling configured to disconnect the push member from the coupler upon the application of a predetermined force to the push member.

16. A push bumper apparatus configured to be coupled to a frame assembly of a vehicle, the vehicle including a bumper positioned in longitudinally spaced relation to the frame assembly, and a fascia positioned in longitudinally spaced relation in front of the bumper, the push bumper apparatus comprising:

a first push member;

a second push member positioned in laterally spaced relation to the first push member;

a first clamping member including a first clamping surface configured to face a first frame surface of the frame assembly;

a second clamping member including a second clamping surface configured to face a second frame surface of the frame assembly;

a fastener connecting the first clamping member and the second clamping member such that the frame assembly is clamped between the first clamping surface and the second clamping surface;

a first support arm configured to couple the first clamping member to the first push member; and a second support arm configured to couple the first clamping member to the second push member, the second support arm positioned in laterally spaced relation to the first support arm.

17. The push bumper apparatus of claim 16, further comprising a connecting member extending between the first and second push members, the first and second push members being releasably coupled to the connecting member such that the lateral spacing between the first and second push members may be varied by replacing the connecting member with a second connecting member having a different width.

18. The push bumper apparatus of claim 16, wherein the frame assembly includes a laterally extending cross-frame member, the first clamping surface of the first clamping member being configured to face a front surface of the cross-frame member, and the second clamping surface of the second clamping member being configured to face a rear surface of the cross-frame member, such that the cross-frame member is clamped therebetween.

19. The push bumper apparatus of claim 16, wherein the first and second support arms are configured to pass through pre-existing openings formed within the fascia.

20. The push bumper apparatus of claim 16, further comprising a breakaway coupling coupled to the first support arm, the breakaway coupling configured to disconnect the first push member from the first clamping member upon application of a predetermined force to the push member.

21. A push bumper apparatus configured to be coupled to a frame assembly of a vehicle, the vehicle including a bumper positioned in longitudinally spaced relation to the frame assembly, and a fascia positioned longitudinally spaced relation in front of the bumper, the push bumper apparatus comprising:

a first push member;

a second push member positioned in spaced relation to the first push member;

a connecting member having a first end connected to the first push member and a second end connected to the second push member; and a coupler configured to couple the first and second push members to the vehicle frame assembly, wherein the first push member and the second push member are not coupled to the bumper of the vehicle.

22. The push bumper apparatus of claim 21, wherein the first and second push members are coupled to the vehicle frame assembly without requiring new openings to be formed in any of the bumper, the frame assembly, and the fiscia.

23. The push bumper apparatus of claim 21, wherein the coupler comprises;

a front clamping member including a first clamping surface configured to face a front surface of the frame assembly;

a rear clamping member including a second clamping surface configured to face a rear surface of the frame assembly; and a fastener connecting the front clamping member and the rear clamping member such that the frame assembly is clamped intermediate the front clamping surface and the rear clamping surface.

24. The push bumper apparatus of claim 23, wherein the frame assembly includes a laterally extending cross-frame member, the first clamping surface of the front clamping member is configured to face a front surface of the cross-frame member, and the second clamping surface of the rear clamping member is configured to face a rear surface of the cross-frame member, such that the cross-frame member is clamped therebetween.

* * * * *